3,035,910
HERBICIDAL COMPOSITION AND METHOD
Gerald A. Boyack and George Swank, Kalamazoo, Mich., assignors to The Upjohn Company, Kalamazoo, Mich., a corporation of Delaware
No Drawing. Filed Feb. 29, 1960, Ser. No. 11,413
14 Claims. (Cl. 71—2.6)

This invention relates to novel herbicidal compositions which contain, in combination, two known herbicidally active compounds, and also relates to a process for employing said compositions in the control of undesirable vegetation.

The present invention consists in a herbicidal composition comprising as the essential active ingredients (a) methylarsonic acid or water-soluble salts thereof and (b) a compound having the formula:

wherein R and $R_1$ represent lower aliphatic hydrocarbon radicals, such that the total number of carbon atoms in the radicals R and $R_1$ is not less than 5 and not more than 12.

The term "lower aliphatic hydrocarbon radical" is intended to mean an acyclic or cyclic aliphatic hydrocarbon radical containing up to 11 carbon atoms, which radical can be saturated or unsaturated. Such radicals include alkyl radicals, for example, methyl, ethyl, propyl, butyl, amyl, hexyl, heptyl, octyl, nonyl, decyl, undecyl, and isomeric forms thereof; alkenyl radicals, for example, allyl, butenyl, pentenyl, hexenyl, heptenyl, octenyl, nonenyl, decenyl, undecenyl, and isomeric forms thereof; alkynyl radicals, for example, ethynyl, propynyl, butynyl, pentynyl, hexynyl, heptynyl, octynyl, nonynyl, decynyl, undecynyl, and isomeric forms thereof; and cycloaliphatic radicals, for example, cyclobutyl, cyclopentyl, cyclopentenyl, methylcyclopentyl, cyclohexyl, dimethylcyclohexyl, cycloheptyl, and isomeric forms thereof.

While methylarsonic acid can be employed as the free acid in the compositions of the invention it is preferred to employ a water soluble salt of the acid. Such salts include the alkali metal salts such as the di-potassium, di-sodium, dilithium, and like salts, the alkaline earth metal salts such as the calcium, magnesium, and like salts, the ammonium salts, such as the salts with ammonia, with alkanolamines, for example, the salts with ethanolamine, diethanolamine, dipropanolamine, triethanolamine, and the like, and the alkylamine salts, for example, the salts with ethylamine, diethylamine, butylamine, isobutylamine, heptylamine, octylamine, dodecylamine, and the like.

Methylarsonic acid and its salts are known to possess herbicidal properties and, in particular, are used in the selective control of undesirable vegetation such as crabgrass and like undesirable grasses. The use of these compounds for the control of crabgrass has been described in U.S. Patent 2,678,265 and in a number of publications such as those by Gallagher et al., Proceedings North Central Weed Control Conference, 1954, 385-9; Daniel et al., ibid., 1956, 125-6; Davis, ibid., 1957, 114; and Campbell et al., ibid., 1957, 29-30. These compounds are effective in destroying crabgrass when applied at any time throughout its entire period and stages of growth. However, these compounds suffer from the disadvantage that, when used to kill crabgrass which is growing in the presence of other desirable grasses, such as lawn grasses, they frequently cause damage to said desirable grasses.

The compounds having the Formula I above also show herbicidal properties and are effective in controlling undesirable vegetation such as crabgrass, white clover, oxalis, chickweed, foxtail, Poa annua, and the like, without causing significant damage to desirable lawn grasses such as rye, fescue, Kentucky bluegrass, and the like, and to crops such as corn, beans, and the like, when employed in concentrations which destroy the crabgrass and other undesirable vegetation. The herbicidal activity, together with the method of preparation, of the compounds of Formula I is discussed in more detail in copending application Serial No. 747,362, filed July 9, 1958. The compounds of Formula I are particularly valuable for the control of crabgrass, especially when growing in the presence of desirable vegetation such as lawn grasses. For this purpose the compounds of Formula I, in which the total number of carbon atoms in the radicals R and $R_1$ is within the range of 7 to 9, are preferred. Such preferred compounds include n-butyl 2-allyloxybenzoate, n-butyl 2-n-propoxybenzoate, n-amyl 2-allyloxybenzoate, and ethyl 2-n-heptyloxybenzoate. However, whilst these compounds give excellent control of crabgrass when applied in the early stages of growth, i.e., up to the 2-leaf stage, they do not consistently give control when applied in the later stages of growth. This presents a problem when compositions containing these compounds are marketed for use by amateur gardeners. The latter are often unwilling to apply crab grass remedies until the crabgrass is clearly visible, by which time it has reached a stage of growth at which control is not achieved consistently using said compositions.

We have now found that, by using a combination of methylarsonic acid or a salt thereof with a compound of Formula I, the deficiencies noted in respect of the individual components can be obviated. We have found further that, surprisingly and unexpectedly, the above two types of herbicide act synergistically in combination, that is, each potentiates the activity of the other when used in combination. Thus, effective control of undesirable vegetation such as crabgrass and the like can be achieved using a combination of methylarsonic acid or a salt thereof and a compound having the Formula I in concentrations at which either component alone would not give complete control. Further, the combination is free from the deficiencies found in the individual components when used alone. Thus, the combination is free from risk of damage to desirable vegetation often present when the methylarsonic acid or salt thereof is used alone, and the combination is effective when applied at any stage of growth in contrast to the compound of Formula I when used alone.

Whilst we have found that synergism occurs over a wide range of proportions of the components of the compositions of the invention, the effect is most pronounced when the proportions are of the order of from about 30 parts to about 0.2 part by weight of the compound of Formula I per 1 part by weight of methylarsonic acid or salt thereof. Preferably the proportions are of the order of about 15 parts to about 1 part by weight of the compound of Formula I per 1 part by weight of methylarsonic acid or salt thereof. The optimum proportions, that is, those proportions in which the synergism is most pronounced, vary according to the particular methylarsonic acid compound and particular compound of Formula I which are employed. For example, in the case of a combination of disodium methylarsonate and n-butyl 2-n-propoxybenzoate the optimum proportions are of the order of about 10 parts by weight of n-butyl 2-n-propoxybenzoate to 1 part by weight of disodium methylarsonate.

The rate at which the combination of the two types of herbicide is applied in accordance with the invention varies over a wide range in accordance with factors such as the nature of the vegetation which is to be treated, the presence or absence of desirable vegetation in association with or proximity to the vegetation to be treated, the proportions of the components in the mixture, etc. In general it is necessary to apply from about 15 lbs. to about 30 lbs. per acre of the combination of herbicides when using the two herbicides in proportions of the order of those given above.

The compositions of the invention can take the form of dusts, dispersible powders, aqueous dispersions, emulsions, or emulsifiable concentrates. They can be prepared by formulating the components individually and mixing the resulting formulations or by formulating the components together. In general the compositions of the invention can be prepared by methods which are well known in the art but in certain instances, to be discussed in detail below, novel methods of formulation have to be adopted.

Thus the herbicidal compositions of the invention comprise as essential active ingredients (a) methylarsonic acid or a salt thereof and (b) a compound having the Formula I, in association with a carrier material. Where the compositions are to be employed as selective herbicides it is advantageous that the carrier material be phytonomic, that is to say, a carrier which can be applied to plants without phytotoxicity or other adverse effects. Where the compositions are to be employed as general herbicides such considerations do not apply.

The herbicidal compositions of the invention can take the form of dusts which are prepared by intimate admixture of the active ingredient with a solid carrier or extender which maintains the compositions in a dry, free-flowing state. Since the compounds having the Formula I are ordinarily liquids, the herbicidal dusts of the invention can be prepared more conveniently by adding to the solid diluent a solution of the compound of Formula I in a volatile solvent such as ethanol, acetone, ether, and the like, mixing to form a paste, drying, and milling. The methylarsonic acid or salt thereof is then added to the resulting product and the latter is again milled. Alternatively, the methylarsonic acid or salt thereof can be milled, or mixed in other ways, with the solid diluent and the resulting mixture can be treated with the compound of Formula I or a solution thereof in a volatile solvent, such as those described above, to form a paste which is dried, if necessary, and milled. In a further alternative, dusts are prepared individually from the compound of Formula I and the methylarsonic acid or salt thereof using the methods described above and the dusts can then be intimately mixed, for example, by milling.

The solid carriers which can be used include the natural clays such as china clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid artificial fertilizers. Such solid compositions can be applied to vegetation in the form of dusts by use of conventional machinery.

A preferred solid composition according to the invention is a dispersible powder which is prepared by incorporating a surfactant in the dust compositions prepared as described above. The dispersible powders so obtained can be added to water to form aqueous dispersions which can be applied to vegetation by conventional spraying machines. The surfactants which can be employed in the preparation of such compositions include alkyl sulfates and sulfonates, alkylbenzene sulfonates, sulfosuccinate esters, polyoxyethylene sulfates, polyoxyethylene sorbitan monolaurate, alkylarylpolyether sulfates, alkylarylpolyether alcohols, alkylnaphthalene sulfonates, alkyl quaternary ammonium salts, sulfated fatty acids and esters, sulfated fatty acid amides, glycerol mannitan laurate, polyalkylether condensates of faty acids, and lignin sulfonates, the sulfates and sulfonates, of course, being used in the form of the soluble salts, for example, their sodium salts.

The herbicidal compositions of the invention also comprise aqueous emulsions. Due to the low solubility of the methylarsonic acid salts in water-immiscible solvents such as aromatic hydrocarbons, high boiling petroleum hydrocarbons and the like, the usual method for the preparation of emulsions, namely the mixing with water of a solution of the active ingredients and a surfactant in a water-immiscible solvent, cannot be used satisfactorily in the present instance. However, the compounds of Formula I are oils at ordinary temperatures and it has been found that satisfactory emulsions can be prepared by agitating a mixture of methylarsonic acid or salt thereof, a compound of Formula I, and a surfactant with water. The emulsion so obtained separates fairly rapidly into two phases but can be re-emulsified in a ready manner by agitating it. Emulsions prepared in this manner are satisfactory provided that they are used within a short period of time. However, prolonged storage of these emulsions leads to partial loss of their herbicidal activity. This difficulty can be overcome by incorporating a buffering agent in the composition to maintain the pH thereof within the range of about 6.0 to about 8.0. Any of a wide variety of known buffering agents can be employed for this purpose. A particularly advantageous buffering agent is that comprising ammonium nitrate in combination with nitric acid. The use of this buffering agent in compositions to be used in the treatment of crabgrass growing in the presence of desirable grasses enables an application of available nitrogen to be made to the desirable grasses simultaneously with the treatment to control crabgrass.

The surfactants which can be employed in the emulsions of the invention are those of the types noted above, the preferred surfactants being of the alkylarylpolyether alcohol type.

The aqueous emulsions of the invention can be supplied to the user in the form of concentrates which require dilution with water before use. Both the concentrated compositions and the diluted compositions are included within the scope of the present invention.

The compositions of the invention which are intended for use in the form of aqueous dispersions or emulsions can also comprise a humectant, that is to say, an agent which will delay the drying of the composition in contact with the vegetation to which it has been applied. Suitable humectants include glycerol, diethylene glycol, solubilized lignins such as calcium lignosulfonate, and the like.

The exact concentration of active ingredient in any of the compositions of the invention is not critical and can vary considerably, provided the combination of active ingredients is applied to the vegetation to be treated at a rate within the range defined above. However, in general it has been found advantageous to employ concentrations of methylarsonic acid or a salt thereof within the range of about 200 to about 3500 parts per million, and concentrations of the compound of Formula I within the range of about 4000 to about 12,000 parts per million in the aqueous emulsions or dispersions used for the treatment of vegetation. The concentration of the combination of active ingredients in the concentrates from which these compositions are prepared can be as high as about 80 percent by weight. The concentration of the compounds of Formula I in the dust formulations of the invention is limited by the generally oily nature of the compounds having the Formula I. However, the concentration of compound of Formula I in the dust formulations of the invention is advantageously of the order of about 1 to about 15 percent by weight.

The concentrations and the rates at which the compositions of the invention are applied will of course vary in accordance with factors such as the nature of the vegetation being treated, whether the treatment is a selective one, the season of the year at which the treatment is made, and the nature of the machine which is used to apply the compositions.

The following are illustrative of the compounds having the Formula I which can be employed in the compositions of the invention: n-butyl 2-methoxybenzoate, n-amyl 2-methoxybenzoate, ethyl 3-n-butoxybenzoate, ethyl 3-n-amyloxybenzoate, methyl 4-n-butoxybenzoate, methyl 4-isobutoxybenzoate, methyl 4-sec-butoxybenzoate, methyl 4-n-amyloxybenzoate, methyl 4-isoamyloxybenzoate, methyl 4-n-hexyloxybenzoate, methyl 4-n-octyloxybenzoate, ethyl 4-n-propoxybenzoate, ethyl 4-isopropoxybenzoate, ethyl 4-n-butoxybenzoate, ethyl 4-isobutoxybenzoate, ethyl 4-sec-butoxybenzoate, ethyl 4-n-amyloxybenzoate, ethyl 4-isoamyloxybenzoate, ethyl 4-n-hexyloxybenzoate, ethyl 4-n-heptyloxybenzoate, ethyl 4-n-octyloxybenzoate, ethyl 4-(1-methylheptyloxy)benzoate, ethyl 4-isoöctyloxybenzoate, ethyl 4-n-nonyloxybenzoate, ethyl 4-n-decyloxybenzoate, n-propyl 4-ethoxybenzoate, n-butyl 4-methoxybenzoate, isobutyl 4-methoxybenzoate, tert-butyl 4-methoxybenzoate, n-amyl 4-methoxybenzoate, isoamyl 4-methoxybenzoate, n-heptyl 4-methoxybenzoate, ethyl 2-allyloxybenzoate, allyl 2-allyloxybenzoate, n-butyl 3-(2-methallyloxy)benzoate, ethyl 4-allyloxybenzoate, ethyl 4-(1-methallyloxy)benzoate, ethyl 4-(2-butenyloxy)benzoate, ethyl 4-(1-ethylallyloxy)benzoate, ethyl 4-(2-pentenyloxy)benzoate, ethyl 4-(1-methyl-2-butenyloxy)benzoate, ethyl 4-(3-methyl-2-butenyloxy)benzoate, ethyl 4-(1-propylallyloxy)benzoate, ethyl 4-(2-hexenyloxy)benzoate, butyl 4-(2-methallyloxy)benzoate, 3-butynyl 4-methoxybenzoate, cyclohexyl 2-methoxybenzoate, cyclohexyl 2-ethoxybenzoate, cyclohexyl 3-methoxybenzoate, cyclohexyl 3-ethoxybenzoate, cyclohexyl 4-methoxybenzoate, cyclohexyl 4-ethoxybenzoate, methyl 4-cyclohexyloxybenzoate, ethyl 4-cyclohexyloxybenzoate, ethyl 4-cyclopentyloxybenzoate, 1-methylheptyl 2-methoxybenzoate, ethyl 2-n-propoxybenzoate, ethyl 2-n-heptyloxybenzoate, n-propyl 2-n-propoxybenzoate, n-propyl 2-n-butoxybenzoate, n-propyl 2-n-amyloxybenzoate, n-propyl 2-n-hexyloxybenzoate, n-propyl 2-n-heptyloxybenzoate, n-butyl 2-ethoxybenzoate, n-butyl 2-n-propoxybenzoate, n-butyl 2-n-butoxybenzoate, n-amyl 2-ethoxybenzoate, n-amyl 2-n-propoxybenzoate, n-amyl 2-n-amyloxybenzoate, n-amyl 2-n-hexyloxybenzoate, n-amyl 2-n-heptyloxybenzoate, isoamyl 2-n-propoxybenzoate, n-hexyl 2-ethoxybenzoate, n-hexyl 2-n-propoxybenzoate, n-hexyl 2-n-butoxybenzoate, n-butyl 4-n-propoxybenzoate, n-butyl 4-n-amyloxybenzoate, n-propyl 2-allyloxybenzoate, n-butyl 2-allyloxybenzoate, n-amyl 2-allyloxybenzoate, isoamyl 2-allyloxybenzoate, n-hexyl 2-allyloxybenzoate, n-octyl 2-allyloxybenzoate, n-butyl 2-(2-methallyloxy)benzoate, n-butyl 4- allyloxybenzoate, n-amyl 4-allyloxybenzoate, n-hexyl 4-allyloxybenzoate, n-butyl 3-allyloxybenzoate, and n-butyl 3-n-propoxybenzoate.

The following examples are illustrative of the process and compositions of the present invention but are not to be construed as limiting.

EXAMPLE 1

A dispersible powder was prepared by mixing intimately 80 g. of Microcel E (a proprietary calcium silicate) and 188 g. of a solution containing 84 percent by weight of n-butyl 2-n-propoxybenzoate, 12 percent by weight of Triton X–100 (an alkylarylpolyether alcohol) and 4 percent by weight of Agrimul 70A (an alkylarylpolyether alcohol mixture). To the product so obtained was added 30 g. of disodium methylarsonate hexahydrate and the mixture was macerated to give a fine dry powder.

This powder was added to 5 gallons of water to give an aqueous dispersion containing approximately 8000 parts per million of n-butyl 2-n-propoxybenzoate and approximately 1000 parts per million of disodium methylarsonate.

In place of the n-butyl 2-n-propoxybenzoate employed as one of the active ingredients in the above compositions, there can be employed any other compound having the Formula I as hereinbefore exemplified.

EXAMPLE 2

An emulsion concentrate was prepared by mechanically agitating 30 g. of disodium methylarsonate hexahydrate, 80 ml. of water, and 188 g. of a solution containing 84 percent by weight of n-butyl 2-n-propoxybenzoate, 12 percent by weight of Triton X–100 and 4 percent by weight of Agrimul 70A. The concentrate so obtained was poured into 5 gallons of water with stirring to obtain an emulsion containing approximately 8000 parts per million of n-butyl 2-n-propoxybenzoate and approximately 1000 parts per million of disodium methylarsonate.

In place of the n-butyl 2-n-propoxybenzoate employed as one of the active ingredients in the above composition there can be used n-butyl 2-allyloxybenzoate, n-amyl 2-allyloxybenzoate, or ethyl 2-n-heptyloxybenzoate.

EXAMPLE 3

An emulsion concentrate was prepared as follows: An aqueous solution containing 90.4 g. of disodium methylarsonate hexahydrate, 180.8 g. of ammonium nitrate, and 58.5 ml. of 3 N nitric acid was made up to 500 ml. by the addition of water and the resulting solution was adjusted to pH 7.5 by the addition of ammonium hydroxide. A mixture of 100 ml. of the resulting solution, 118 ml. of n-butyl 2-n-propoxybenzoate, 12 ml. of Triton X–100, and 5 ml. of Agrimul N4R (an alkylarylpolyether alcohol) was agitated mechanically to form an emulsion. The emulsion separated on standing but could be reformed readily by agitation.

In place of the n-butyl 2-n-propoxybenzoate employed as one of the active ingredients in the above composition there can be employed n-butyl 2-allyloxybenzoate, n-amyl 2-allyloxybenzoate, or ethyl 2-n-heptyloxybenzoate.

EXAMPLE 4

A trial was carried out on a large area of Kentucky bluegrass which had been seeded with hairy crabgrass and was heavily infested with mature flowering crabgrass plants. The area was divided into 48 five-by-five-foot plots. The soil in one-half the number of plots was kept very moist while the soil in the other plots was not watered artificially. Eight treatments were carried out using various rates of application of disodium methylarsonate and n-butyl 2-n-propoxybenzoate alone or in combination as shown in Table I. Each treatment was replicated three times for the dry and wet soil conditions. The compositions containing disodium methylarsonate and n-butyl 2-n-propoxybenzoate alone or in combination were prepared as follows: The disodium methylarsonate was formulated as an aqueous solution containing 12.6% w./w. of disodium methylarsonate. The composition containing n-butyl 2-n-propoxybenzoate alone was prepared by pouring 188 g. of a solution containing 84 percent by weight of n-butyl 2-n-propoxybenzoate, 12 percent by weight of Triton X–100, and 4 percent by weight of Agrimul 70A into 5 gallons of water. The compositions containing the two acitve ingredients in combination were prepared by mixing appropriate quantities of the compositions containing the individual active materials. All the compositions were applied using a knapsack sprayer. The treatments were repeated after an interval of 7 days from the first application and the condition of the crabgrass was assessed 24 days after the first application. The effect on the crabgrass was recorded using a scale of 0 indicating no effect through 10 indicating complete kill, each figure being the mean of the results for each of the 3 replicates in the treatment. The effect on the Kentucky bluegrass was assessed on the same scale. The results are shown in Table I.

Table I

| Treatment | Rate of application, wt. (oz.)/ 1,000 sq. ft. | Crabgrass Dry area | Crabgrass Wet area | Kentucky Bluegrass |
|---|---|---|---|---|
| n-Butyl 2-n-propoxybenzoate | 5.1 | 0 | 0 | 0 |
| Do | 6.4 | 0 (stunting) | 0 (stunting) | 0 |
| Disodium methylarsonate | 0.63 | 1 (regrowth) | 1 (regrowth) | 3 |
| Do | 1.26 | 3 | 3 | 5 |
| n-Butyl 2-n-propoxybenzoate | 5.1 | 10 | 10 | 2 |
| Disodium methylarsonate | 0.63 | | | |
| n-Butyl 2-n-propoxybenzoate | 6.4 | 10 | 10 | 2 |
| Disodium methylarsonate | 0.63 | | | |
| n-Butyl 2-n-propoxybenzoate | 5.1 | 10 | 10 | 2 |
| Disodium methylarsonate | 1.26 | | | |
| n-Butyl 2-n-propoxybenzoate | 6.4 | 10 | 10 | 2 |
| Disodium methylarsonate | 1.26 | | | |

We claim:

1. A herbicidal composition comprising a herbicidally effective amount of a mixture of (1) a compound selected from the class consisting of methylarsonic acid and a water-soluble salt thereof selected from the class consisting of alkali metal, alkaline earth metal, and ammonium salts, and a synergistic proportion of (2) a compound having the formula:

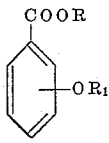

wherein R and $R_1$ represent lower aliphatic hydrocarbon radicals such that the total number of carbon atoms in the radicals R and $R_1$ is not less than 5 and not more than 12.

2. A herbicidal composition comprising as the essential active ingredients (1) a compound selected from the class consisting of methylarsonic acid and a water-soluble salt thereof selected from the class consisting of alkali metal, alkaline earth metal, and ammonium salts, and (2) a compound having the formula:

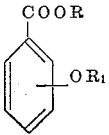

wherein R and $R_1$ represent lower aliphatic hydrocarbon radicals such that the total number of carbon atoms in the radicals R and $R_1$ is not less than 5 and not more than 12, said active ingredients being present in the proportion of from about 30 parts to about 0.2 part by weight of a compound of the above formula per 1 part by weight of methylarsonic acid or salt thereof.

3. A herbicidal composition comprising a herbicidally effective amount of a mixture of (1) a compound selected from the class consisting of methylarsonic acid and a water-soluble salt thereof selected from the class consisting of alkali metal, alkaline earth metal, and ammonium salts, and a synergistic proportion of (2) a compound selected from the class consisting of n-butyl 2-allyloxybenzoate, n-amyl 2-allyloxybenzoate, n-butyl 2-n-propoxybenzoate, and ethyl 2-n-heptyloxybenzoate.

4. A herbicidal composition comprising as the essential active ingredients (1) a compound selected from the class consisting of methylarsonic acid and a water-soluble salt thereof selected from the class consisting of alkali metal, alkaline earth metal, and ammonium salts, and (2) a compound selected from the class consisting of n-butyl 2-allyloxybenzoate, n-amyl 2-allyloxybenzoate, n-butyl 2-n-propoxybenzoate, and ethyl 2-n-heptyloxybenzoate, said active ingredients being present in the proportions of from about 30 parts to about 0.2 part by weight of a compound of the latter class per 1 part by weight of the methylarsonic acid or salt thereof.

5. A herbicidal composition comprising a herbicidally effective amount of a mixture of a water-soluble salt of methylarsonic acid and a synergistic proportion of n-butyl 2-n-propoxybenzoate said water-soluble salt of methylarsonic acid being selected from the class consisting of alkali metal, alkaline earth metal, and ammonium salts.

6. A herbicidal composition comprising as the essential active ingredients a water-soluble salt of methylarsonic acid and n-butyl 2-n-propoxybenzoate in the proportions of from about 30 parts to about 0.2 part by weight of n-butyl 2-n-propoxybenzoate per 1 part by weight of the methylarsonate salt said water-soluble salt of methylarsonic acid being selected from the class consisting of alkali metal, alkaline earth metal, and ammonium salts.

7. A herbicidal composition comprising as the essential active ingredients disodium methylarsonate and n-butyl 2-n-propoxybenzoate in the proportions of approximately 10 parts by weight of n-butyl 2-n-propoxybenzoate per 1 part by weight of disodium methylarsonate.

8. A herbicidal composition in the form of an aqueous emulsion comprising a herbicidally effective amount of a mixture of (1) a compound selected from the class consisting of methylarsonic acid and a water-soluble salt thereof selected from the class consisting of alkali metal, alkaline earth metal, and ammonium salts, and a synergistic proportion of (2) a compound having the formula:

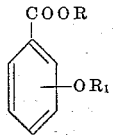

wherein R and $R_1$ represents lower aliphatic hydrocarbon radicals such that the total number of carbon atoms in the radicals R and $R_1$ is not less than 5 and not more than 12, a surfactant and water, said composition being maintained at a pH within the range of 6.0 to 8.0 by means of a buffering agent.

9. A composition according to claim 8 wherein the buffering agent comprises a combination of ammonium nitrate and nitric acid.

10. A herbicidal composition in the form of an aqueous emulsion comprising a herbicidally effective amount of a mixture of disodium methylarsonate and a synergistic proportion of n-butyl 2-n-propoxybenzoate, water and a surfactant, said composition being maintained at a pH within the range of 6.0 to 8.0 by means of a buffering agent.

11. The composition of claim 10 wherein the buffering agent comprises a combination of ammonium nitrate and nitric acid.

12. A method of controlling selectively the growth of crabgrass in the presence of growing desirable vegetation which comprises applying to the vegetation containing crabgrass a herbicidally effective amount of a mixture comprising (1) a compound selected from the class consisting of methylarsonic acid and a water-soluble salt thereof, selected from the class consistinf of alkali metal, alkaline earth metal, and ammonium salts, and a synergistic proportion of (2) a compound having the formula:

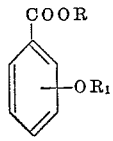

wherein R and $R_1$ represent lower aliphatic hydrocarbon radicals such that the total number of carbon atoms in the radicals R and $R_1$ is not less than 5 and not more than 12.

13. A method of controlling selectively the growth of crabgrass in the presence of growing desirable vegetation which comprises applying to the vegetation containing crabgrass a herbicidally effective amount of a mixture comprising (1) a compound selected from the class consisting of methylarsonic acid and a water-soluble salt thereof selected from the class consisting of alkali metal, alkaline earth metal, and ammonium salts, and a synergistic proportion of (2) a compound selected from the class consisting of n-butyl 2-allyloxybenzoate, n-amyl 2-allyloxybenzoate, n-butyl 2-n-propoxybenzoate, and ethyl 2-n-heptyloxybenzoate.

14. A method of controlling selectively the growth of crabgrass in the presence of growing desirable vegetation which comprises applying to the vegetation containing crabgrass a herbicidally effective amount of a mixture comprising disodium methylarsonate and a synergistic proportion of n-butyl 2-n-propoxybenzoate.

References Cited in the file of this patent

UNITED STATES PATENTS

| | | |
|---|---|---|
| 2,394,916 | Jones | Feb. 12, 1946 |
| 2,678,265 | Schwerdle | May 11, 1954 |
| 2,754,241 | Schwerdle | July 10, 1956 |

OTHER REFERENCES

Rice et al., in "Proceedings, Northeastern Weed Control Conference," January 1960, pages 284 to 287.